(12) United States Patent
Chiang

(10) Patent No.: US 11,891,135 B2
(45) Date of Patent: Feb. 6, 2024

(54) TRACK LINK PLATE AND TRACK LINK ASSEMBLY

(71) Applicant: EVERPADS CO., LTD., Taichung (TW)

(72) Inventor: Chun-Li Chiang, Taichung (TW)

(73) Assignee: EVERPADS CO., LTD., Taichung (TW)

( * ) Notice: Subject to any disclaimer, the term of this patent is extended or adjusted under 35 U.S.C. 154(b) by 247 days.

(21) Appl. No.: 17/382,321

(22) Filed: Jul. 21, 2021

(65) Prior Publication Data

US 2022/0033018 A1 Feb. 3, 2022

(30) Foreign Application Priority Data

Jul. 28, 2020 (TW) .................................. 109209666
Feb. 4, 2021 (CN) .......................... 202120345137.6

(51) Int. Cl.
*B62D 55/21* (2006.01)

(52) U.S. Cl.
CPC .................................... *B62D 55/21* (2013.01)

(58) Field of Classification Search
CPC ....... B62D 55/20; B62D 55/205; B62D 55/21
See application file for complete search history.

(56) References Cited

U.S. PATENT DOCUMENTS

| 2,168,053 A * | 8/1939 | Starr ...................... | B62D 55/28 305/113 |
| 5,183,318 A * | 2/1993 | Taft ....................... | B62D 55/205 305/192 |
| 2009/0026836 A1* | 1/2009 | Maeda ................. | B62D 55/205 305/196 |
| 2009/0230763 A1* | 9/2009 | Sakai ..................... | B62D 55/28 305/202 |
| 2014/0083782 A1* | 3/2014 | Brewer ................ | B62D 55/202 180/9.1 |
| 2014/0292068 A1* | 10/2014 | Hisamatsu ............ | B62D 55/21 305/202 |
| 2017/0043820 A1* | 2/2017 | Brooks ................ | B62D 55/205 |

* cited by examiner

*Primary Examiner* — S. Joseph Morano
*Assistant Examiner* — Emily G. Castonguay
(74) *Attorney, Agent, or Firm* — CKC & Partners Co., LLC

(57) ABSTRACT

A track link plate includes a main body, a first shaft hole, a second shaft hole, two through holes, a supporting rib and a first extending portion. The first shaft hole passes through a first end of the main body. The second shaft hole passes through a second end of the main body. The two through holes are arranged in an interval between the first shaft hole and the second shaft hole. The supporting rib is located between the two through holes. The first extending portion protrudes outward from a second surface of the main body. A distance of the first extending portion from the edge of the through holes to the rotating inner edge is greater than or equal to one third of a total height of the main body. Therefore, the strength of the track link plate can be strengthened.

12 Claims, 12 Drawing Sheets

TRACK LINK PLATE AND TRACK LINK ASSEMBLY

RELATED APPLICATIONS

This application claims priority to Taiwan Application Serial Number 109209666, filed Jul. 28, 2020 and Chinese Application Serial Number 202120345137.6, filed Feb. 4, 2021, which is herein incorporated by reference.

BACKGROUND

Technical Field

The present disclosure relates to a track link plate and a track link assembly. More particularly, the present disclosure relates to a track link plate and a track link assembly for mobile vehicles.

Description of Related Art

A track link assembly is formed by a plurality of track link plates which are connecting to each other. Each of the track link plates is able to rotate relatively to each other within a certain range. Therefore, the track link assembly has the characteristic of deformability. When facing the rugged terrain, the track link assembly can still maintain the contact area with the ground to maintain the thrust. Therefore, the track link plates are widely used in heavy duty machinery with high load. The track link plate usually has two shaft holes for pin assemblies to insert for connection, and the through holes are usually disposed between the two shaft holes for the space of assembling. In order to reduce the cost, the prior track link plate not only reduces the thickness of the main body, but also enlarges the through holes as much as possible to lighten the weight. However, the structural strength of the track link assembly is also reduced, and often causes the track link plate to break when encountering special terrain or suddenly increase of load. Therefore, the cost loss of the replacement of the track chain plate is increased, and the related replacement work is also time-consuming, and resulted in the delay of the original engineering project.

Please refer to FIG. 8, and FIG. 9. FIG. 8 shows a side view of a conventional track link plate 11. FIG. 9 shows a cross-sectional view of the conventional track link plate 11 taken along line 9-9 in FIG. 8. The conventional track link plate 11 is mainly used for mobile vehicles. According to FIG. 8 and FIG. 9, the conventional track link plate 11 includes a main body, a first shaft hole 112 and a second shaft hole 114. The first shaft hole 112 passes through one end of the main body, and the second shaft hole 114 passes through the other end of the main body. The first shaft hole 112 and the second shaft hole 114 are for connecting to pin bolts and pin sleeves, respectively, and as shown in FIG. 9, the inner edges and the outer edges of the first shaft hole 112 are parallel to each other, which means that the thickness of the main body around the first shaft hole 112 is uniform. When a plurality of the track link plates 11 and the pin assemblies are combined to form a track link assembly, each of the track link plates 11 can be rotated relative to each other, and the inner edge of the first shaft hole 112 is the main structure for transmitting the power from the external gear hauling the pin assemblies. Since the inner edge of the first shaft hole 112 must withstand the most of the force, when the load is too heavy or the acceleration and deceleration of the power changes significantly, the inner edge of the first shaft hole 112 is likely to be unable to withstand the instantaneous impact force and splits. If the fracture occurs during the operation of large machinery, it will bring considerable danger, and its subsequent related replacement operations are also quite laborious and time-consuming, which will have an impact on the operating costs of the practitioners.

Based on the abovementioned problems, how to strengthen the mechanical structure of the track link plate for extending its service life becomes a pursuit target for practitioners.

SUMMARY

According to one embodiment of the present disclosure, a track link plate, which is for connecting at least two pin assemblies, each of the pin assemblies comprising a pin sleeve and a pin bolt, each of the pin bolts are inserted into each of the pin sleeves. The track link plate includes a main body, a first shaft hole, a second shaft hole, two through holes, a supporting rib, and a first extending portion. The first shaft hole passes through a first end of the main body, and is for the pin sleeve of one of the pin assemblies to insert from a first surface of the main body. The second shaft hole passes through a second end of the main body, and is for the pin bolt of the other of the pin assemblies to insert from the first surface of the main body. The two through holes are arranged in an interval between the first shaft hole and the second shaft hole, and pass through the main body along a first axial direction of the first shaft hole. The supporting rib is located between the two through holes. The first extending portion protrudes outward from a second surface of the main body, located between a rotating inner edge of the main body and an edge of each of the through holes, and extends from the second end to the first end. A distance between the rotating inner edge of the main body and a rotating outer edge of the main body is a total height, and a distance of the first extending portion from each of the edges of the through holes to the rotating inner edge is greater than or equal to one third of the total height.

According to another embodiment of the present disclosure, a track link assembly includes at least two pin assemblies and at least two track link plates. Each of the pin assemblies includes a pin sleeve and a pin bolt, and each of the pin bolts is inserted into each of the pin sleeves. Each of the track link plates includes a main body, a first shaft hole, a second shaft hole, two through holes, a supporting rib and a first extending portion. The first shaft hole passes through a first end of the main body. The second shaft hole passes through a second end of the main body. The two through holes are arranged in an interval between the first shaft hole and the second shaft hole, and pass through the main body along a first axial direction of the first shaft hole. The supporting rib is located between the two through holes. The first extending portion protrudes outward from a second surface of the main body, the first extending portion is located between a rotating inner edge of the main body and an edge of each of the through holes, and extends from the second end to the first end. A distance between the rotating inner edge of the main body and a rotating outer edge of the main body is a total height. A distance of the first extending portion from the edge of each of the through holes to the rotating inner edge of the main body is greater or equal to one third of the total height. One of the pin assemblies passes through and is disposed on the first shaft hole of one of the track link plates from a first surface of the one of the track link plates, the other of the pin assemblies passes through the first shaft hole of another of the track link plates and then passes through and disposes on the second shaft hole of the another of the track link plates, and the second shaft hole of the one of the track link plates is for the pin bolt of the other of the pin assemblies to insert in.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details. That is, in some embodiment, the practical details are unnecessary. In addition, for simplifying the drawings, some conventional structures and elements will be simply illustrated, and repeated elements may be represented by the same labels.

In addition, it will be understood that when an element (or mechanism or module) is referred to as being "disposed on", "connected to" or "coupled to" another element, it can be directly disposed on, connected or coupled to the other one element, or it can be indirectly disposed on, connected or coupled to the other one element, that is, intervening elements may be present. In contrast, when an element is referred to as being "directly disposed on," "directly connected to" or "directly coupled to" another element, there are no intervening elements present. The terms first, second, third, etc. are used herein to describe various elements or components, these elements or components should not be limited by these terms. Consequently, a first element or component discussed below could be termed a second element or component.

Figure 1:
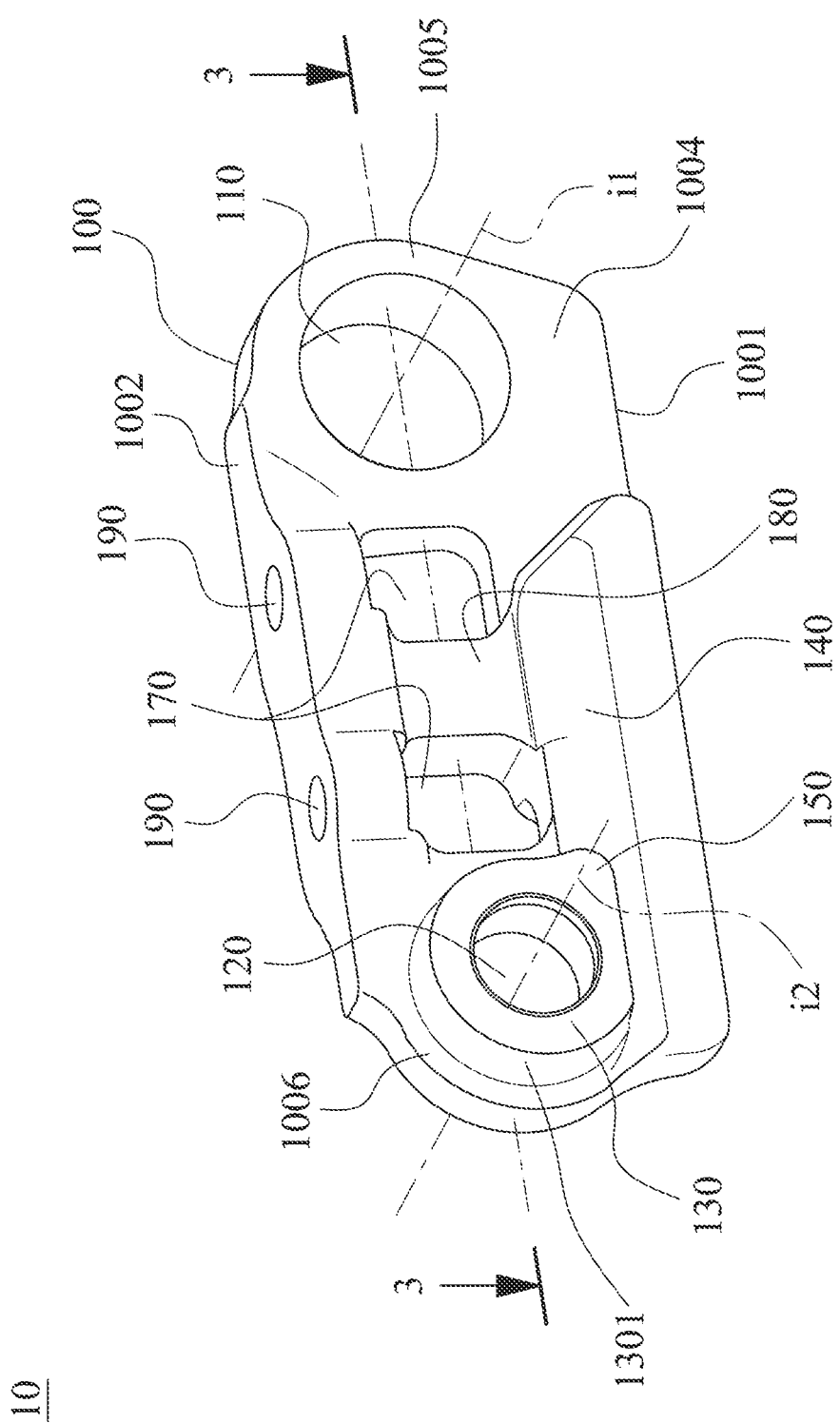
FIG. 1 shows a three dimensional schematic view of a track link plate according to one embodiment of the present disclosure.
Figure 2:
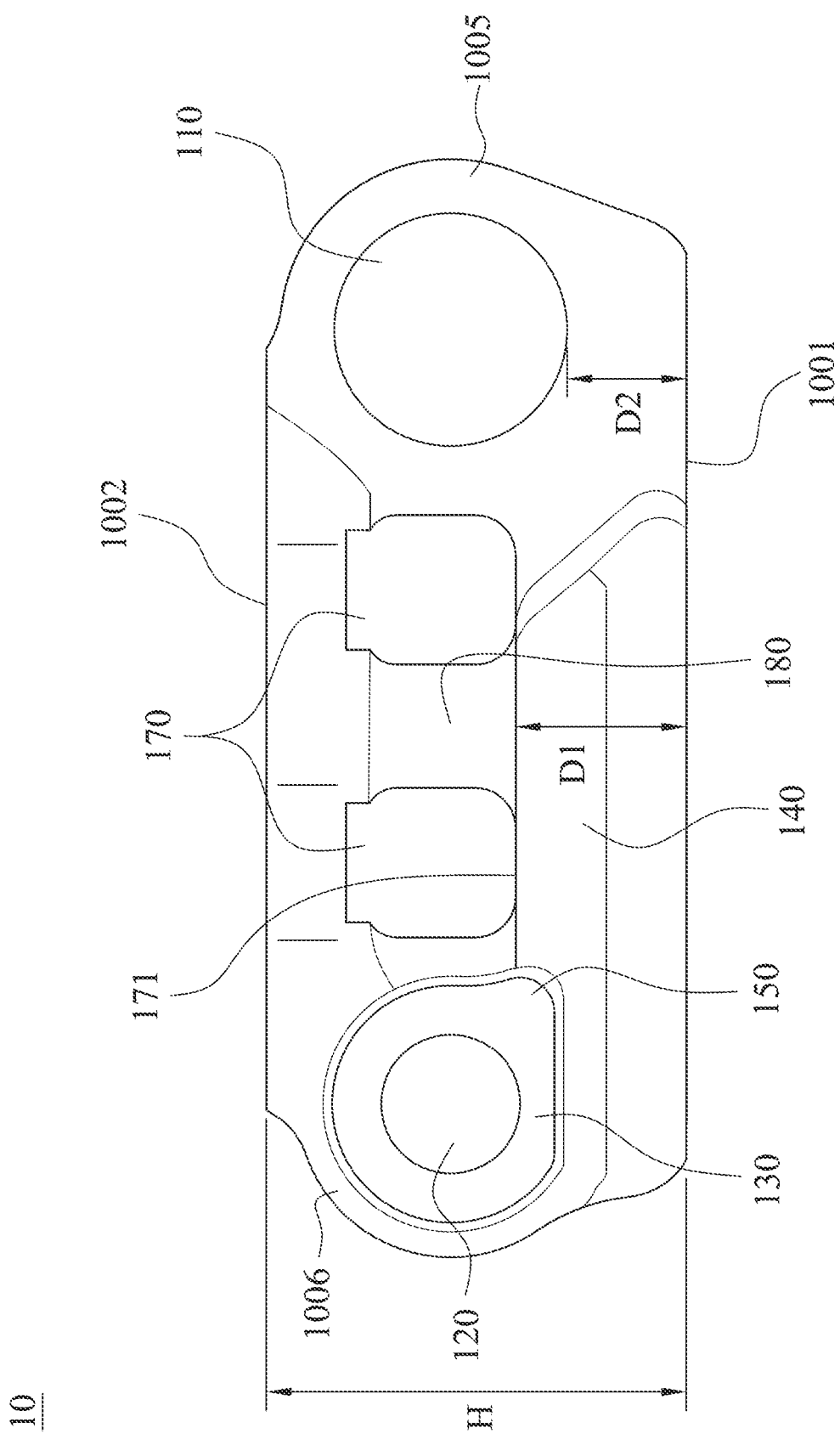
FIG. 2 shows a side view of the track link plate according to the embodiment of FIG. 1.
Figure 3:
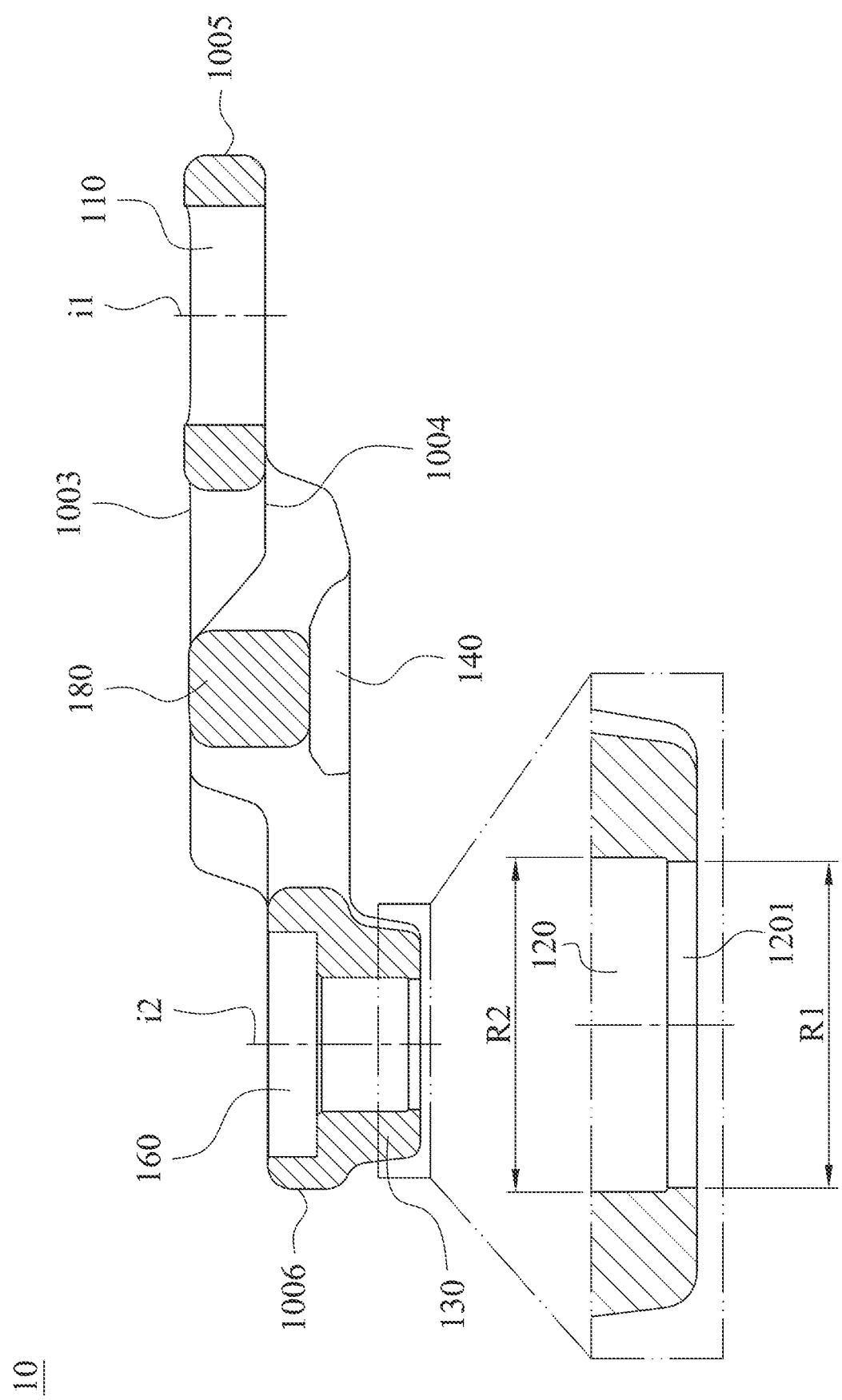
FIG. 3 shows a cross-sectional view of the track link plate taken along line 3-3 in FIG. 1.
Figure 4:
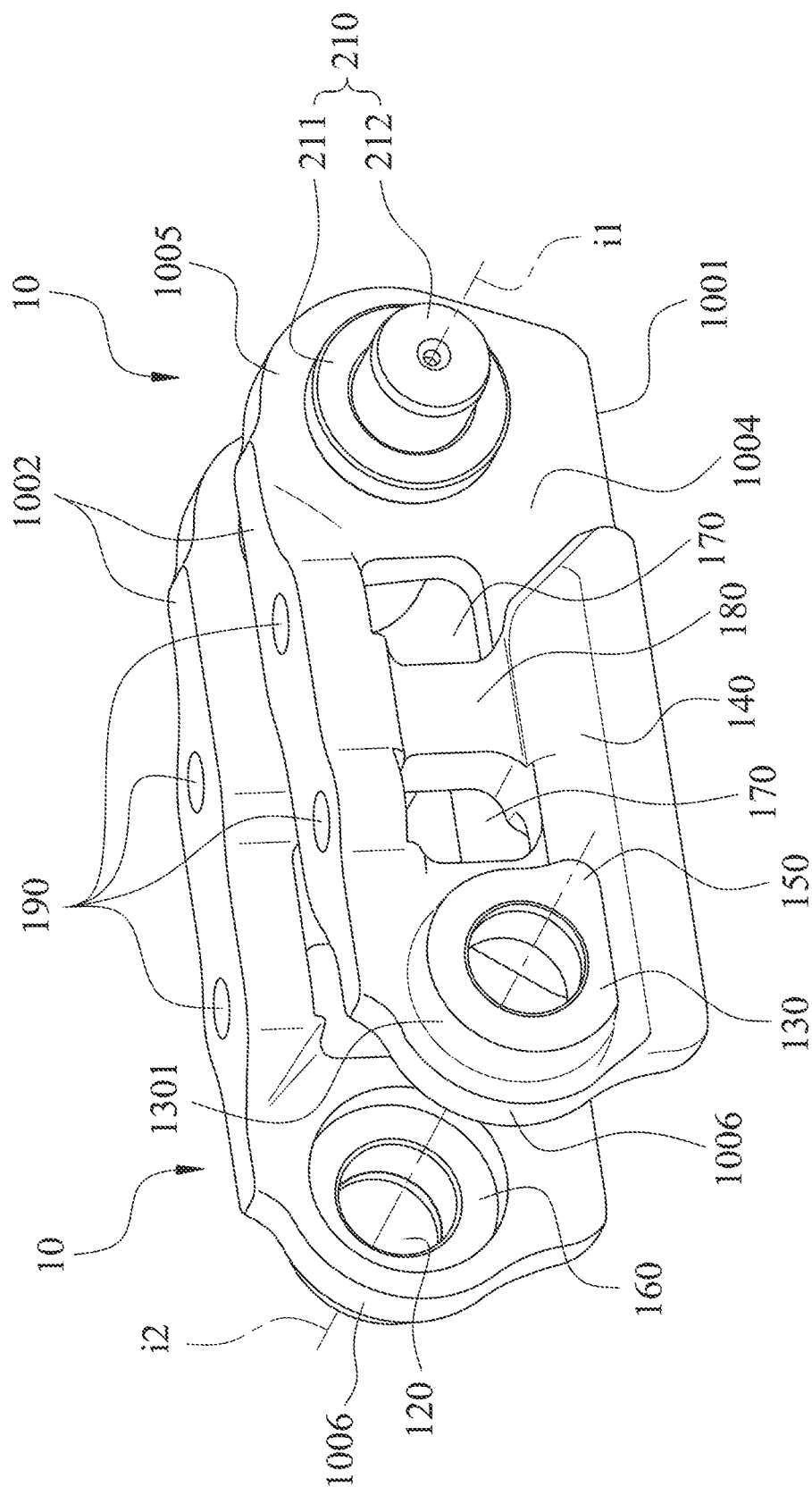
FIG. 4 shows a partial three dimensional schematic view of a track link assembly according to another embodiment of the present disclosure.

Please refer to FIG. 1, FIG. 2, and FIG. 3. FIG. 1 shows a three dimensional schematic view of a track link plate 10 according to one embodiment of the present disclosure. FIG. 2 shows a side view of the track link plate 10 according to the embodiment of FIG. 1. FIG. 3 shows a cross-sectional view of the track link plate 10 taken along line 3-3 in FIG. 1. According to FIG. 1 to FIG. 3, the track link plate 10 includes a main body (its reference numeral is omitted), a first shaft hole 110, a second shaft hole 120, two through holes 170, a supporting rib 180 and a first extending portion 140. The first shaft hole 110 passes through a first end 1005 of the main body, the second shaft hole 120 passes through a second end 1006 of the main body. The two through holes 170 are arranged in an interval between the first shaft hole 110 and the second shaft hole 120, and pass through the main body along a first axial direction i1 of the first shaft hole 110. The supporting rib 180 is located between the two through holes 170. The first extending portion 140 protrudes outward from a second surface 1004 of the main body, located between the rotating inner edge 1001 and an edge 171 of each of the through holes 170, and extends from the second end 1006 to the first end 1005. The track link plate 10 can further include a rotating outer edge 1002. The rotating outer edge 1002 is located on the main body, relative to the rotating inner edge 1001, and is for connecting a track pad (not shown). A distance from the rotating inner edge 1001 of the main body to the rotating outer edge 1002 is a total height H of the track link plate 10, and a distance D1 of the first extending portion 140 from the edge 171 to the rotating inner edge 1001 is greater than or equal to one third of the total height H. The track link plate 10 of the embodiment of FIG. 1 is for connecting at least two pin assemblies 210 (as shown in FIG. 4). Each of the pin assemblies 210 includes a pin sleeve 211 (as shown in FIG. 4) and a pin bolt 212 (as shown in FIG. 4). Each of the pin bolts 212 inserts into each of the pin sleeves 211, the first shaft hole 110 is for the pin sleeve 211 of one of the pin assemblies 210 to insert from the first surface 1003 of the main body, and the second shaft hole 120 is for the pin bolt 212 of another of the pin assemblies 210 to insert from the first surface 1003. The detailed connecting relationship of the track link plates 10 and the pin assemblies 210 will be described in subsequent embodiments.

Through the configuration of the first extending portion 140, the thickness of the main body between the first shaft hole 110 and the second shaft hole 120 can be increased, and the strength of the track link plates 10 can be strengthened.

In detail, the distance D1 of the first extending portion 140 from the edge 171 of each of the through holes 170 to the rotating inner edge 1001 is greater than a minimum distance D2 from the first shaft hole 110 to the rotating inner edge 1001. Since the rotating inner edge 1001 is closer to the force application end of the sprocket, it is favorable for enhancing the rigidity of the main body by increasing the thickness of the first extending portion 140.

Each of the track link plates 10 can further include a protruding portion 130 and a second extending portion 150. The protruding portion 130 protrudes annularly from the second surface 1004 along a second axial direction i2 of the second shaft hole 120 and can increase the structural strength around the second shaft hole 120. The second extending portion 150 is located on the second surface 1004, and extends from a part of an outer annular surface 1301 of the protruding portion 130 toward the first shaft hole 110. As shown in FIG. 2, one portion of the second extending portion 150 can extend to the first extending portion 140 so as to reduce the step difference between the protruding portion 130 and the first extending portion 140.

Furthermore, as shown in FIG. 3, a surface of the supporting rib 180 is aligned with the outermost edge of the first surface 1003 of the track link plate 10, which means that both are smooth continuous surfaces. The configuration can reduce the structural step difference, avoid stress concentration on the structural connecting area, simultaneously increase its cross-sectional area so as to strengthen the supporting force, achieve effective space utilization, and reduce the complexity of the corresponding mold.

According to FIG. 1, the track link plate 10 can further include two assembling holes 190. Each of the assembling holes 190 passes outward through the rotating outer edge 1002 from each of the through holes 170. The assembling holes 190 are for locking members (not shown) passing through to make the track pads combined with the track link plate 10 and driven by the track link plate 10. The track pads are consumable materials, which are used to replace the track link plate 10 to contact the road surface directly, and the corresponding specifications can be replaced according to actual conditions. In addition, the through holes 170 not only can reduce the weight of the track link plate 10, but also can facilitate the replacement of the track pads.

According to FIG. 3, the track link plate 10 can further include an annular groove 160 which is concavely disposed on the first surface 1003 of the main body along the second axial direction i2 of the second shaft hole 120 and communicates with the second shaft hole 120. Therefore, it is favorable for the positioning of the pin sleeve 211. The detail will be described in subsequent embodiments.

Figure 6:
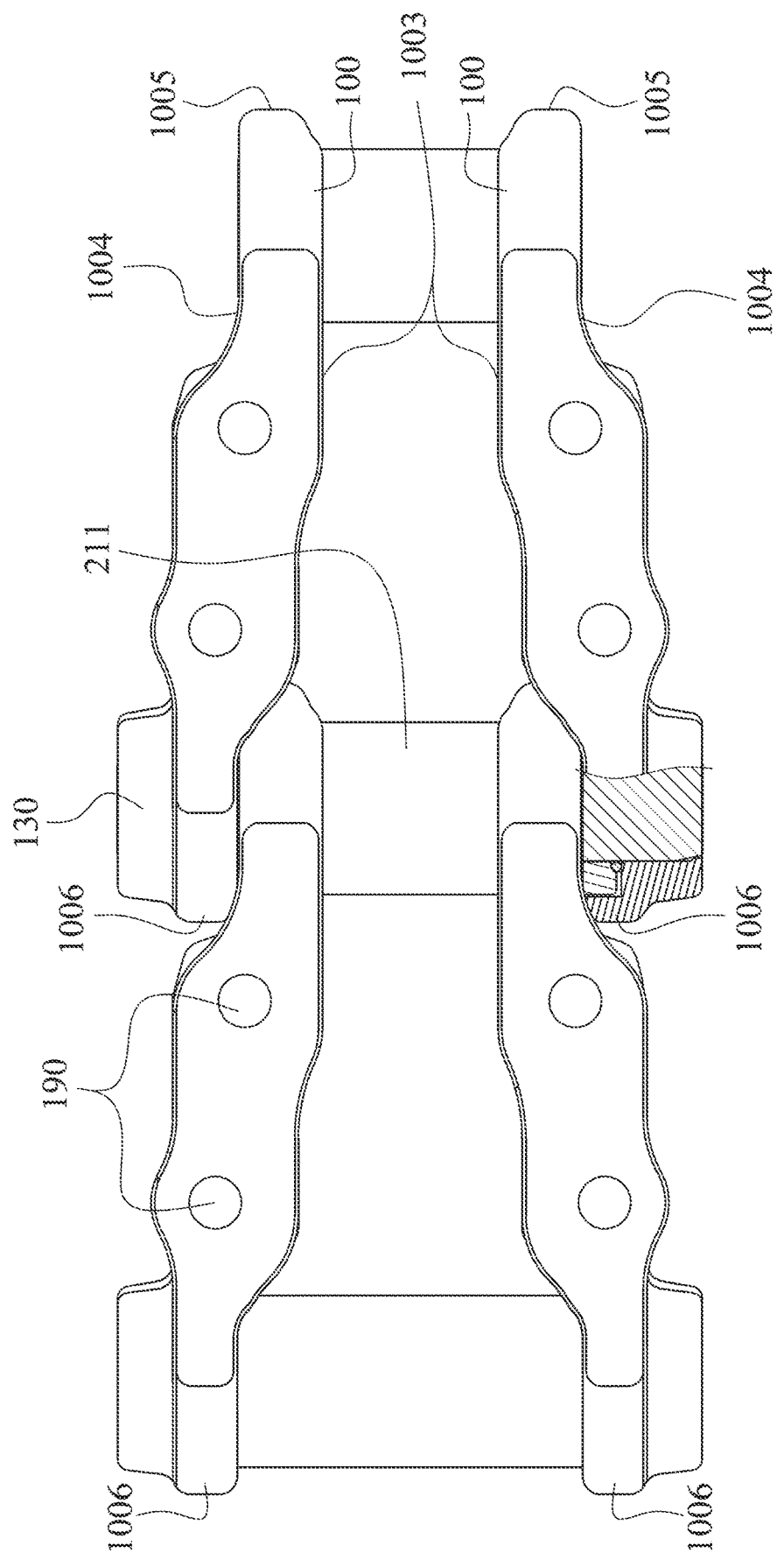
FIG. 6 shows a partial top view of the track link assembly according to the embodiment of FIG. 4.
Figure 12:
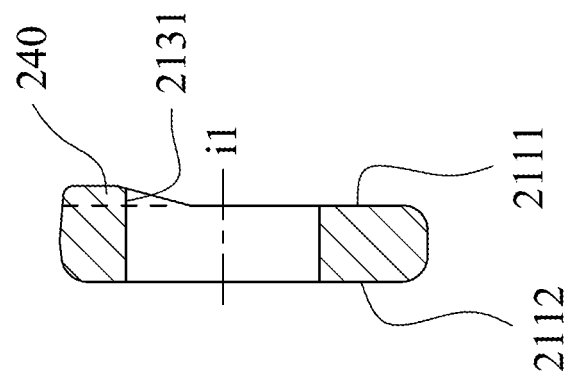
FIG. 12 shows a cross-sectional view of the track link plate taken along line 12-12 in FIG. 11.

Moreover, please refer to FIG. 1, and also refer to FIG. 6 and FIG. 12, each of the track link plate 10 can further include a strengthening portion 100. The strengthening portion 100 protrudes outward from the first surface 1003 along the first axial direction i1, and adjacent to the first shaft hole 110. An inner arc surface of the strengthening portion 100 can integrally communicate with one portion of the hole wall of the first shaft hole 110 so as to strengthen the ability of withstand impact of the inner hole wall of the first shaft hole 110.

Figure 5:
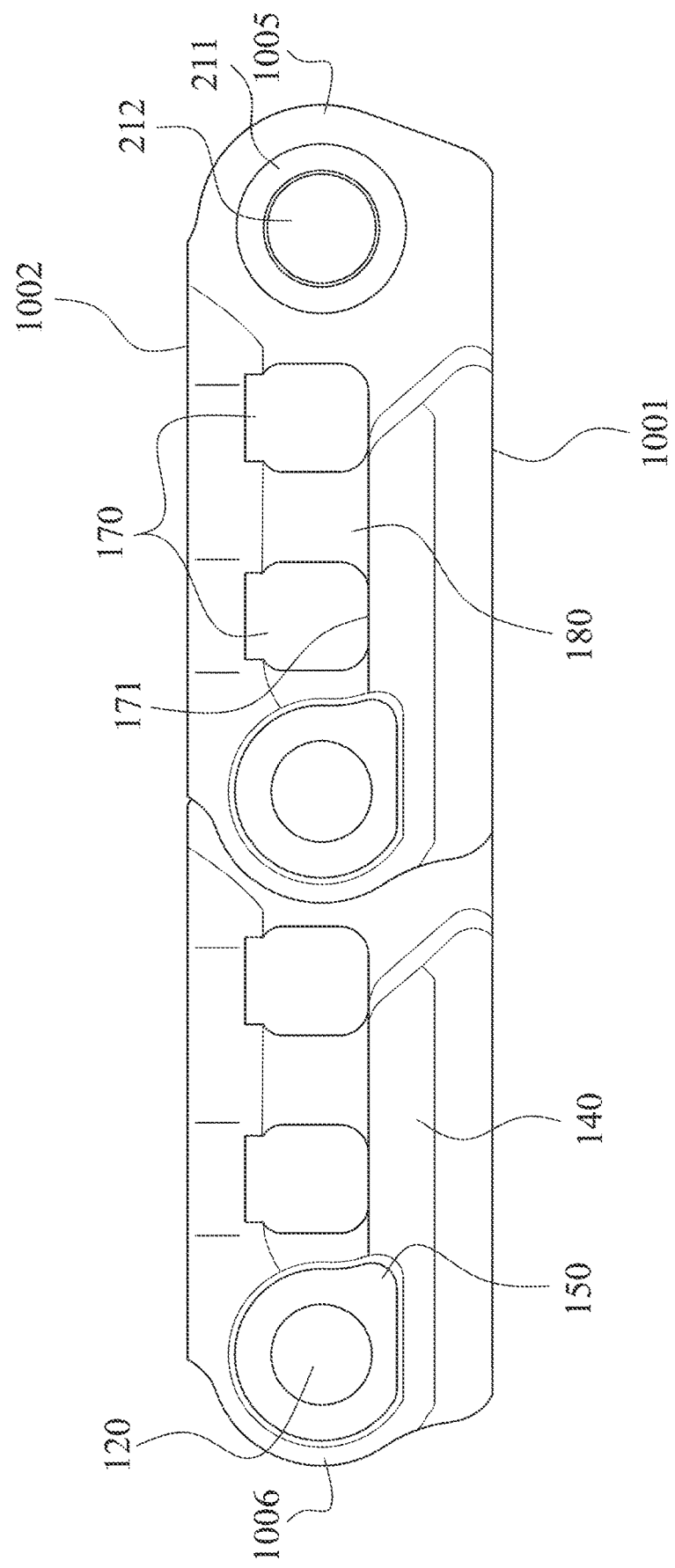
FIG. 5 shows a partial side view of the track link assembly according to the embodiment of FIG. 4.

Please refer to FIG. 4, FIG. 5, and FIG. 6, and also refer to FIG. 1 to FIG. 3. FIG. 4 shows a partial three dimensional schematic view of a track link assembly according to another embodiment of the present disclosure. FIG. 5 shows a partial side view of the track link assembly according to the embodiment of FIG. 4. FIG. 6 shows a partial top view of the track link assembly according to the embodiment of FIG. 4, the track link assembly can select the required number of sections according to the actual conditions of use, and only two sections are shown in FIG. 6. According to FIG. 1 to FIG. 6, the track link assembly includes at least two pin assemblies 210 and at least two track link plates 10. Each of the pin assemblies 210 includes a pin sleeve 211 and a pin bolt 212, each of the pin bolts 212 inserts in each of the pin sleeves 211. The structure of the track link plate 10 is the same as the aforementioned embodiment in FIG. 1, but the present disclosure is not limited thereto. In detail, the track link plate 10 includes a main body, a first shaft hole 110, a second shaft hole 120, two through holes 170, a supporting rib 180 and a first extending portion 140. The first shaft hole 110 passes through a first end 1005 of the main body. The second shaft hole 120 passes through a second end 1006 of the main body. The two through holes 170 are arranged in an interval between the first shaft hole 110 and the second shaft hole 120, and pass through the main body along a first axial direction i1 of the first shaft hole 110. The supporting rib 180 is located between the two through holes 170. The first extending portion 140 protrudes outward from the second surface 1004 of the main body, located between the rotating inner edge 1001 of the main body and the edge 171 of each of the through holes 170, and extends from the second end 1006 to the first end 1005. A distance from the rotating inner edge 1001 of the main body to the rotating outer edge 1002 thereof is a total height H of the track link plate 10. A distance D1 of the first extending portion 140 from the edge 171 to the rotating inner edge 1001 is greater than or equal to one third of the total height H. One of the pin assemblies 210 passes through and is disposed on the first shaft hole 110 of one of the track link plates 10 from the first surface 1003 of the one of the track link plates 10. The other of the pin assemblies 210 passes through the first shaft hole 110 of another of the track link plates 10 from the first surface 1003 of the another of the track link plates 10, then passes through and disposed on the second shaft hole 120 of the another of the track link plates 10, and the second shaft hole 120 of the one of the track link plates 10 is for the pin bolt 212 of the other of the pin assemblies 210 to insert in.

Figure 7:
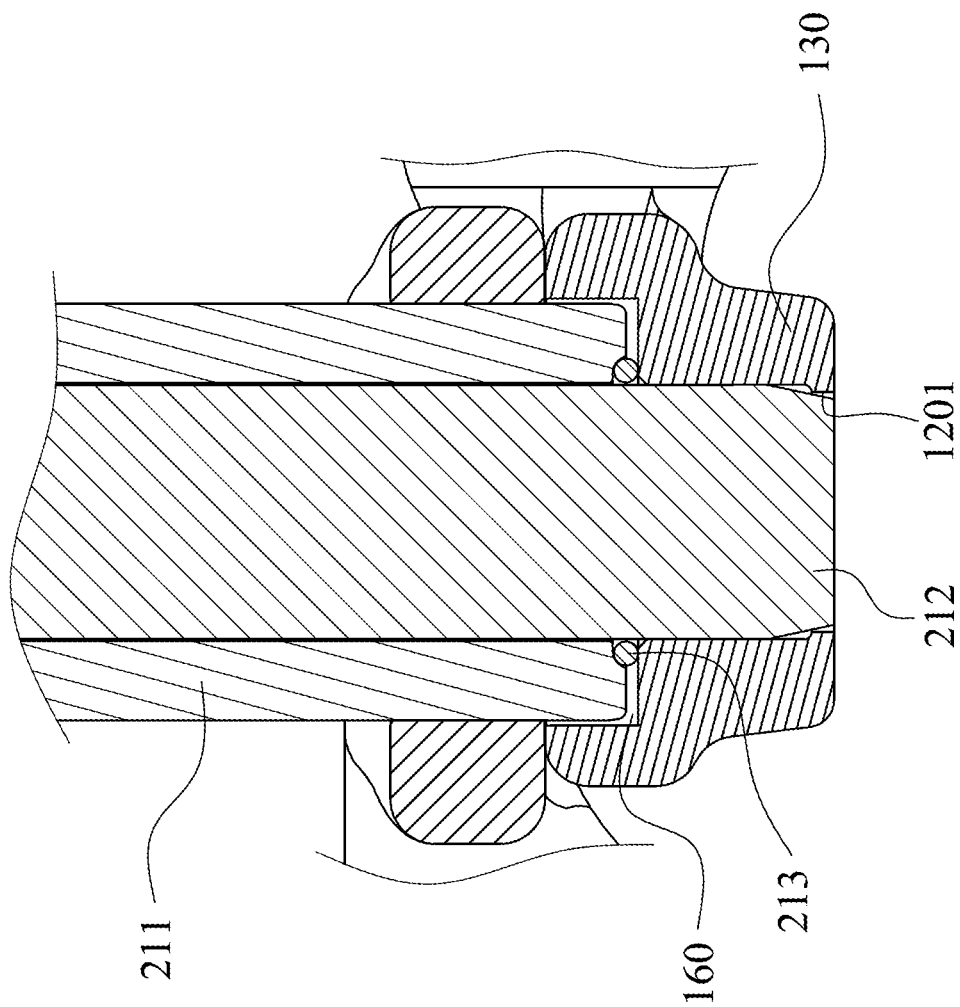
FIG. 7 shows a partial cross-sectional view of the track link assembly according to the embodiment of FIG. 6.
Figure 9:
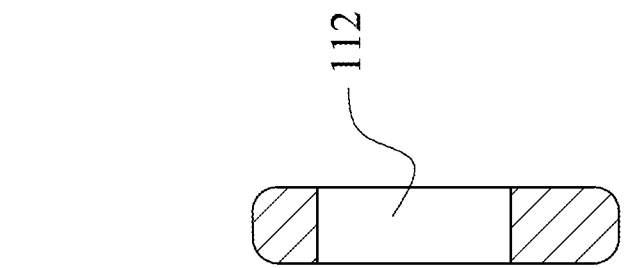
FIG. 9 shows a cross-sectional view of the conventional track link plate taken along line 9-9 in FIG. 8.
Figure 8:
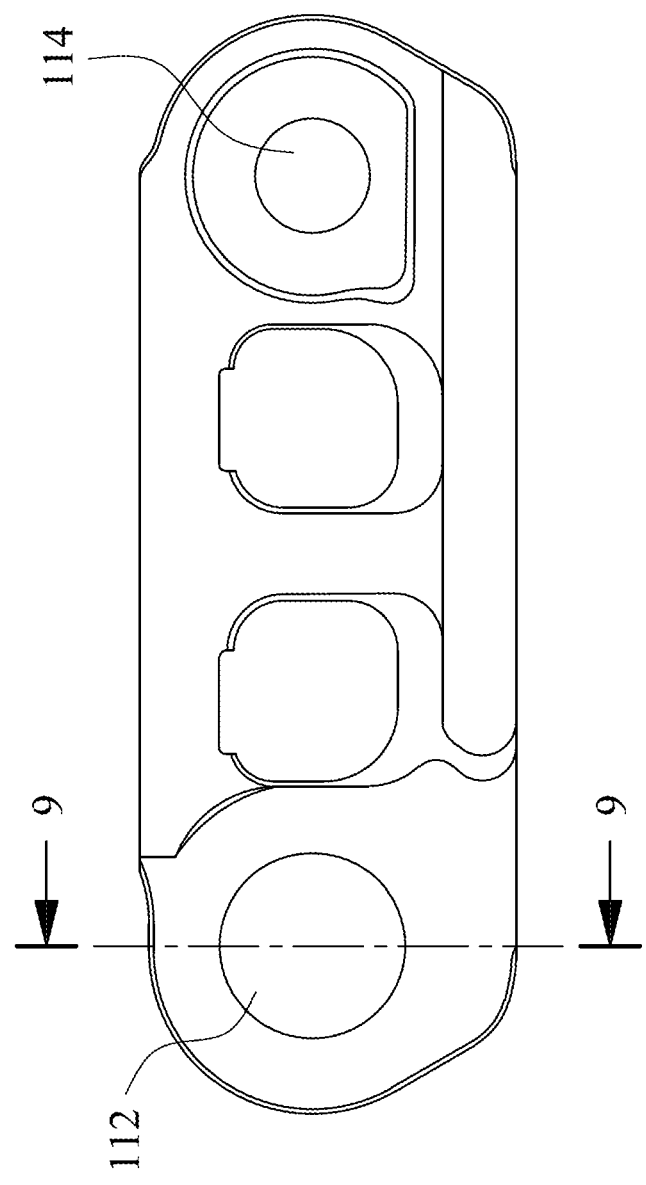
FIG. 8 shows a side view of a conventional track link plate.

Please refer to FIG. 7, and also refer to FIG. 4. FIG. 7 shows a partial cross-sectional view of the track link assembly according to the embodiment of FIG. 6. The track link assembly is formed by a plurality of track link plates 10 connected by the pin assemblies 210, and is rotated by the sprocket to apply thrust to the road surface to drive mobile vehicles. Compared with wheels, the track link assembly can better fit the rugged road surface to adapt variable terrain. Each section of the track link assembly is formed by connecting the pin assemblies 210 to two track link plates 10, which have symmetrical structure, that is, all the protruding portion 130, the first extending portion 140 and the second extending portion 150 of the track link plates 10 connected relatively are geometrically symmetric. Each of the track link plates 10 can further include an annular groove 160, which is concavely disposed on the first surface 1003 of the main body along the second axial direction i2 of the second shaft hole 120 and communicated with the second shaft hole 120. When the one end of the pin sleeve 211 of one of the pin assemblies 210 is accommodated in the annular groove 160, the pin bolt 212 of the aforementioned one of the pin assemblies 210 passes through the pin sleeve 211 and inserts into the second shaft hole 120. In other words, the pin sleeve 211 of the one of the pin assemblies 210 passes through the first shaft hole 110 along the first axial direction i1 from the first surface 1003 and protrudes from the second surface 1004 of the track link plate 10. The protruding end of the pin sleeve 211 then inserts into the annular groove 160 of the other of the track link plates 10. And the pin bolt 212 of the aforementioned pin assemblies 210 passes through the pin sleeve 211 along the first axial direction i1 and inserts into the second shaft hole 120 of the other of the track link plates 10. Accordingly, the track link assembly can be formed by connecting a plurality of track link plates 10.

In detail, the second shaft hole 120 can have a stopper 1201 disposed on the protruding portion 130 close to the outside of the track link plate 10 for the pin bolt 212 to abut against. As shown in FIG. 3 and FIG. 7, the stopper 1201 is located at one end of the second shaft hole 120 that is away from the annular groove 160. Moreover, the hole diameter R1 of the stopper 1201 is smaller than the hole diameter R2 of the second shaft hole 120, and the dimension of the stopper 1201 is an interference fit with the outer diameter of the pin bolt 212. The end of the pin bolt 212 may have a chamfer. When the pin bolt 212 inserts into the second shaft hole 120 from the first surface 1003, the end of the pin bolt 212 will abut against the stopper 1201 without protruding the track link plate 10. When the track link assembly is connected in series, the stopper 1201 can prevent the pin bolt 212 from shifting left and right between the track link plates 10 on both sides. In other embodiments, the stopper also can be designed as a chamfer, but the present disclosure is not limited thereto.

According to FIG. 6 and FIG. 7, each of the pin assemblies 210 can further include at least two dust proof rings 213, one of the dust proof rings 213 is sleeved on one end of the pin bolt 212, the other of the dust proof rings 213 is sleeved on the other end of the pin bolt 212, each of the dust proof rings 213 is abutted by each of the annular grooves 160 and attached on one end surface of each of the pin sleeves 211. Grease is usually coated between the pin sleeves 211 and the pin bolts 212 to reduce the friction, so that the track link plates 10 can rotate smoothly relative to each other, and the elastic deformation of the dust proof rings 213 can make its inner edge tightly cover the surface of the pin bolt 212 to prevent the grease from leaking out. Meanwhile, it can prevent the external soil or dust from penetrating between the pin bolts 212 and the pin sleeves 211 to cause the grease to be dirty and hardened.

Figure 10:
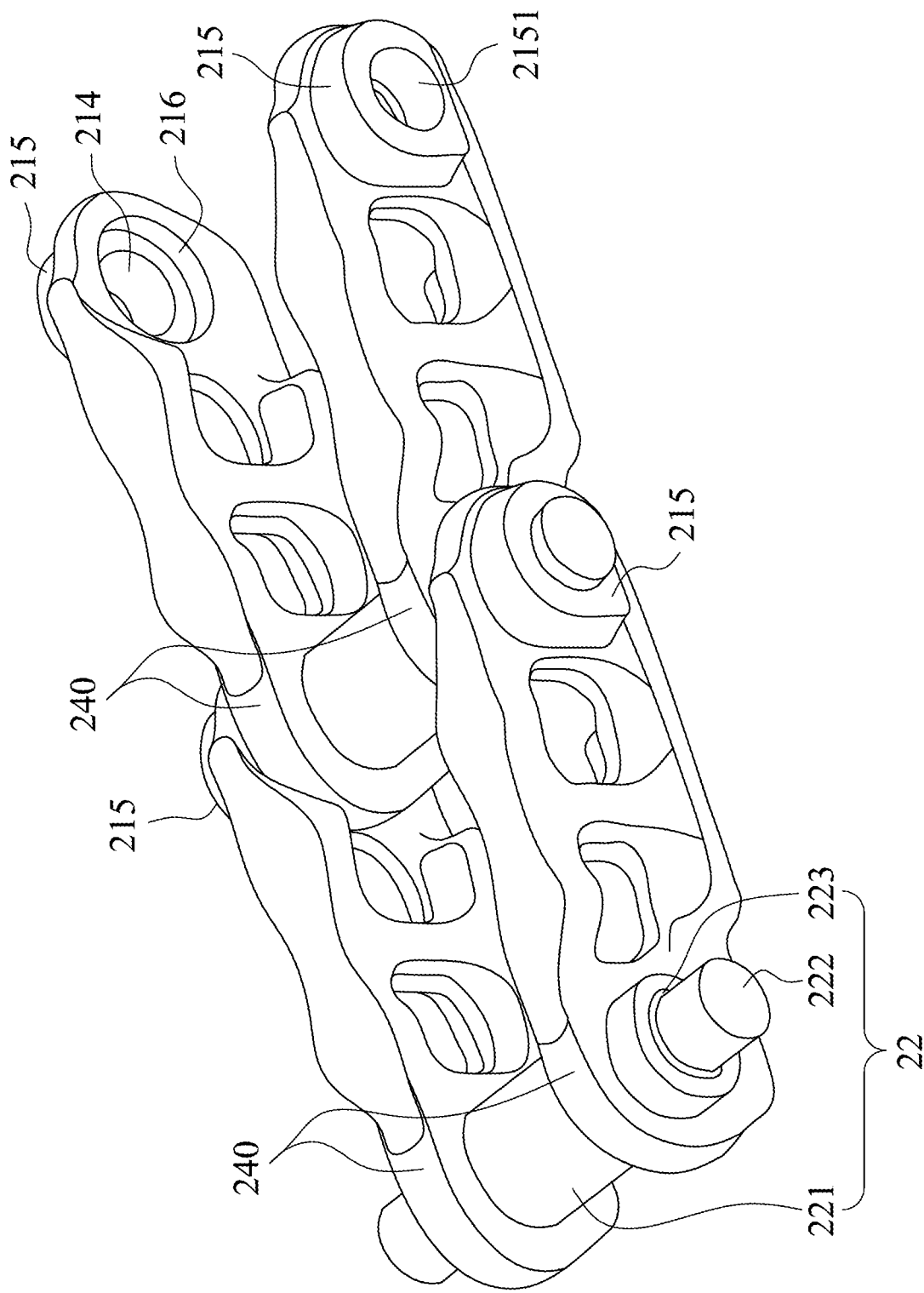
FIG. 10 shows a three dimensional view of a track link assembly according to another embodiment of the present disclosure.
Figure 11:
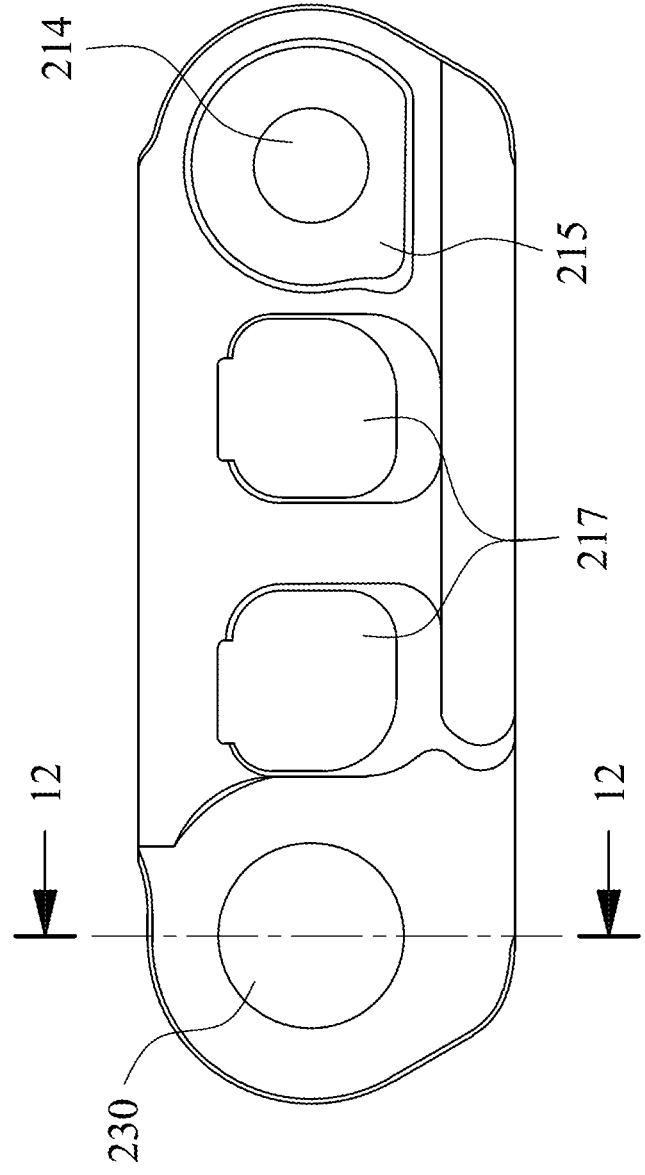
FIG. 11 shows a side view of the track link plate of the embodiment of FIG. 10.

Please refer to FIG. 10, FIG. 11 and FIG. 12. FIG. 10 shows a three dimensional view of a track link assembly according to another embodiment of the present disclosure. FIG. 11 shows a side view of the track link plate 21 of the embodiment of FIG. 10. FIG. 12 shows a cross-sectional view of the track link plate 21 taken along line 12-12 in FIG. 11. According to FIG. 10, FIG. 11 and FIG. 12, a track link assembly includes at least two pin assemblies 22 and at least two track link plates 21, each of the pin assemblies 22 includes a pin sleeve 221 and a pin bolt 222, and each of the pin bolts 222 inserts into each of the pin sleeves 221. Each of the track link plates 21 includes a main body, a first shaft hole 230, a strengthening portion 240 and a second shaft hole 214. The first shaft hole 230 passes a first end of the main body. The strengthening portion 240 extends outward a first surface 2111 along a first axial direction i1 of the first shaft hole 230, and the strengthening portion 240 is adjacent to the first shaft hole 230. The second shaft hole 214 passes a second end of the main body. One of the pin assemblies 22 passes through and is disposed on the first shaft hole 230 of the aforementioned one of the track link plates 21 from the first surface 2111 of one of the track link plates 21. The other of the pin assemblies 22 passes through and is disposed on the aforementioned first shaft hole 230 of another track link plates 21 from the first surface 2111 of the other track link plates 21, then passes through and is disposed on the second shaft hole 214 of the aforementioned one of the track link plates 21, and the aforementioned second shaft hole 214 of the one of the track link plates 21 is for the pin bolt 222 of the aforementioned another of the pin assemblies 22 to insert into. And so on, the pin assemblies 22 can be utilized to connect each of the track link plates 21 in series.

Figure 13:
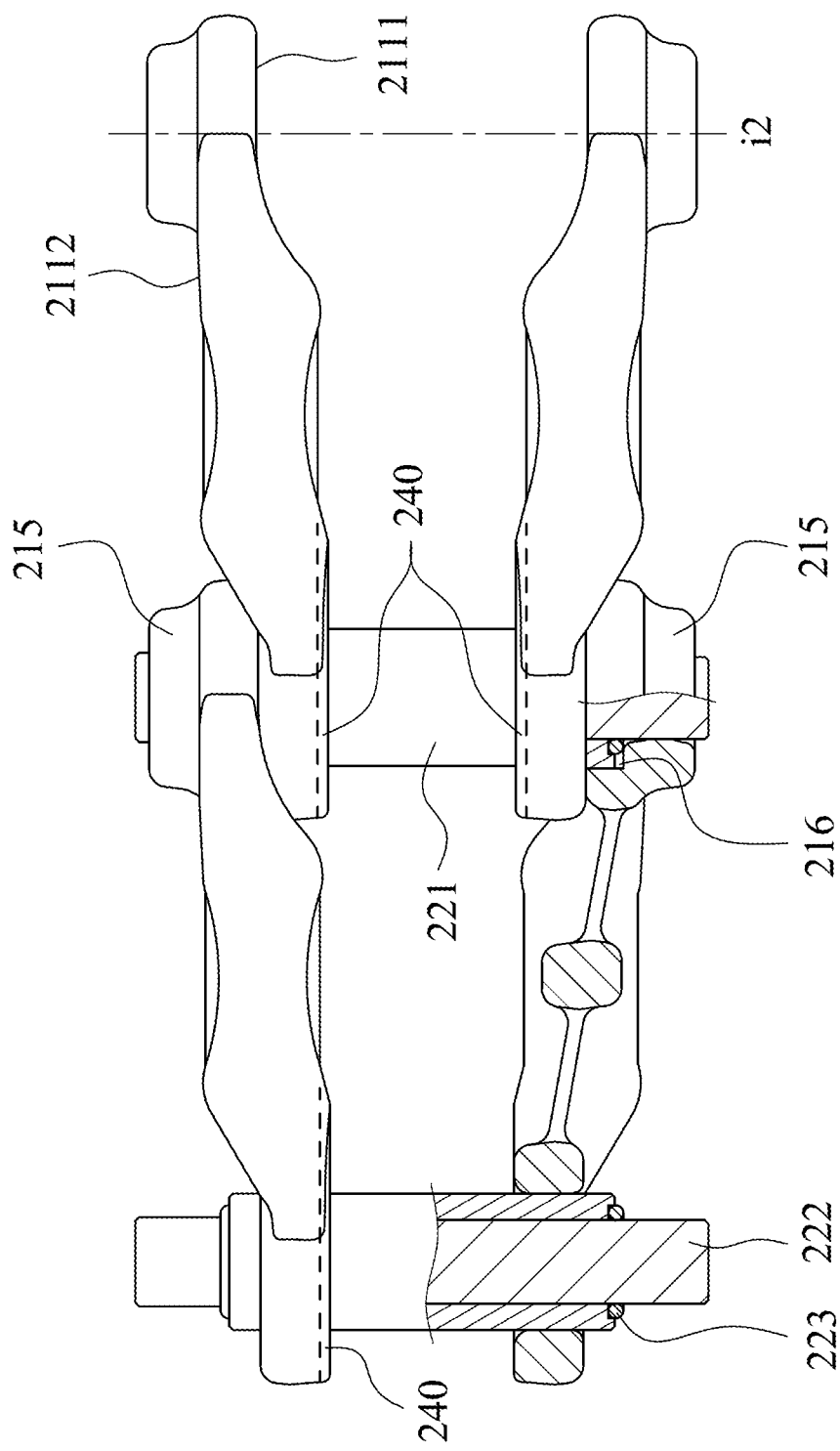
FIG. 13 shows a partial cross-sectional view of the track link assembly of FIG. 10.

In detail, the strengthening portion 240 can be formed integrally on the main body during forging or casting. An inner arc surface 2131 of the strengthening portion 240 is integrally connected to at least one portion of the hole wall of the first shaft hole 230. However, in other embodiments, the strengthening portion 240 only needs to be adjacent to the first shaft hole 230, located on the side facing the sprocket when combined with the sprocket, and the present disclosure is not limited thereto. The track link plate 21 can further include an annular groove 216 that is concavely disposed on the first surface 2111 of the main body along a second axial direction i2 (as shown in FIG. 13) of the second shaft hole 214 and communicated with the second shaft hole 214. When one end of the pin sleeve 221 of the other of the pin assemblies 22 is accommodated in the annular groove 216, the pin bolt 222 of the other of the pin assemblies 22 inserts into the second shaft hole 214. The track link plate 21 can further include a protruding portion 215 that is annularly protruding from the second surface 2112 of the main body along a second axial direction i2 of the second shaft hole 214. The inner annular surface of the protruding portion 215 defines an insertion hole 2151 that is communicated with the second shaft hole 214.

Although it is not easy to estimate the weight of the load that the user may apply during the operation, the relevant practitioner can still reduce the impact of the existing load on each of the shaft holes by reducing the weight of the track link plates 21. Therefore, the main body can further include at least one through hole 217 located between the first shaft hole 230 and the second shaft hole 214, and passing through the main body along a direction parallel to the first axial direction i1, which can reduce the weight without affecting the structural strength of the track link plates 21. In FIG. 3 and FIG. 4, the number of the through holes is two, but the shape, number and dimension of the through holes 217 can be arbitrarily changed according to actual using conditions, and the present disclosure is not limited thereto.

Figure 14:
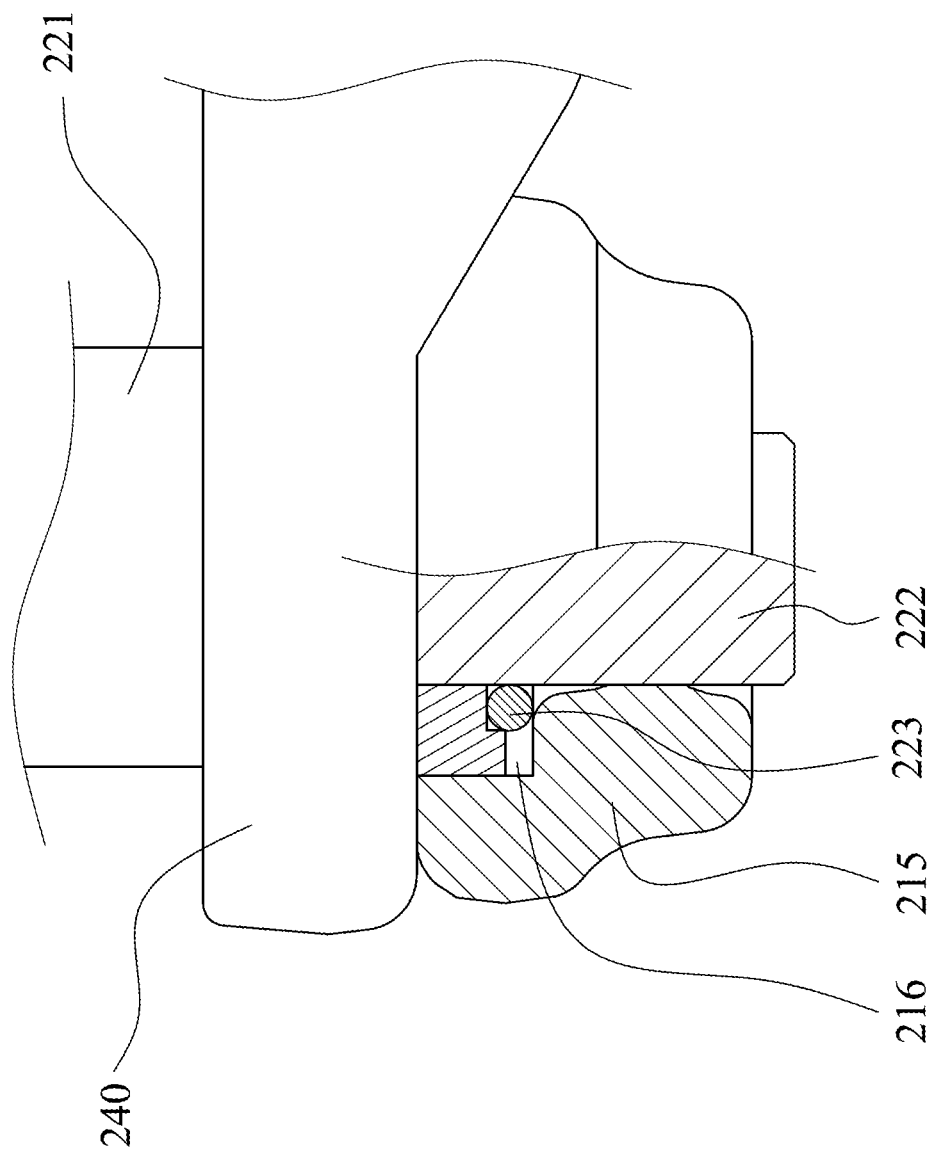
FIG. 14 shows a partial enlarged view of the track link assembly of FIG. 13.

Please refer to FIG. 13 and FIG. 14, and also refer to FIG. 10 and FIG. 11. FIG. 13 shows a partial cross-sectional view of the track link assembly of FIG. 10. FIG. 14 shows a partial enlarged view of the track link assembly of FIG. 13. According to FIG. 13 and FIG. 14, each of the pin assemblies 22 can further include at least two dust proof rings 223. One of the dust proof rings 223 is sleeved on one end of the pin bolt 222, the other of the dust proof rings 223 is sleeved on another end of the pin bolt 222. When the two dust proof rings 223 are combined with the track link plates 21, the two dust proof rings 223 can be abutted by the two annular grooves 216, respectively, and attached on an end surface of each of the pin sleeves 221. Therefore, during the operation of the track link assembly, the elasticity of each of the dust proof rings 223 can be used to absorb the slight shifting of each of the pin assemblies 22 relative to each of the track link plates 21 in the first axial direction i1 (as shown in FIG. 12).

A number of the track link plates 21 and a number of the pin assemblies 22 can be more than two, respectively. During assembling, one end of the pin bolt 222 can pass through the pin sleeve 221, then be sleeved by the dust proof rings 223, and pass through the first shaft hole 230 of one of the track link plates 21, and then insert into the second shaft hole 214 of another of the track link plates 21 to make the two track link plates 21 connect with each other, and so on, connect a plurality of track link plates 21 in series. After that, the plurality of track link plates 21 connected in series can be arranged symmetrically with the plurality of the track link plates 21 with corresponding number. The strengthening portion 240 of each of the track link plates 21 is arranged toward a rotating outer edge of the track link assembly, that is, the strengthening portion 240 is closed to the position, which each of the pin sleeves 221 engaged with the outer teeth of the sprocket. Therefore, the ability of withstand impact of the inner edge of the first shaft hole 230 can be strengthened.

Moreover, each of the pin assemblies 22 can further include grease (not shown), which is arranged between the pin sleeve 221 and the pin bolt 222. The grease can reduce the friction between the pin sleeve 221 and the pin bolt 222, so that each of the track link plates 21 can be rotated more smoothly relative to each other. That is, the power from the driving sprocket can be transmitted more efficiently, and it can also prevent improper angles figured between each of the track link plates 21 to make the inner hole edge of the first shaft hole 230 or the second shaft hole 214 cannot withstand the impact force equally, and then affects the service life of the track link assembly.

In summary, through the structural configuration of the first extending portion and the second extending portion of the track link plates and the track link assembly of the present disclosure, one side of the supporting rib is aligned with the first surface of the track link plate to reduce the structural step difference, so that stress concentration can be avoided and the force that the track link plates can withstand can be strengthened, thereby extending the service life of the track link plates and the track link assembly.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A track link plate, which is for connecting at least two pin assemblies, each of the pin assemblies comprising a pin sleeve and a pin bolt, each of the pin bolts inserted into each of the pin sleeves, the track link plate comprising:
   a main body;
   a first shaft hole passing through a first end of the main body, and for the pin sleeve of one of the pin assemblies to insert from a first surface of the main body;
   a second shaft hole passing through a second end of the main body, and for the pin bolt of the other of the pin assemblies to insert from the first surface of the main body;
   two through holes arranged in an interval between the first shaft hole and the second shaft hole, and passing through the main body along a first axial direction of the first shaft hole;
   a supporting rib located between the two through holes, wherein a thickness of the supporting rib is substantially uniform; and
   a first extending portion protruding outward from a second surface of the main body, located between a rotating inner edge of the main body and an edge of each of the through holes, and extending from the second end toward the first end;
   wherein, a distance between the rotating inner edge of the main body and a rotating outer edge of the main body is a total height, and a distance of the first extending portion from each of the edges of the through holes to the rotating inner edge is greater than or equal to one third of the total height.

2. The track link plate of claim 1, further comprising:
   two assembling holes, each of the assembling holes passing through from each of the through holes to the rotating outer edge.

3. The track link plate of claim 1, wherein the distance of the first extending portion from the edge of each of the through holes to the rotating inner edge is greater than a minimum distance from the first shaft hole to the rotating inner edge.

4. The track link plate of claim 1, further comprising:
   a protruding portion annularly protruding from the second surface along a second axial direction of the second shaft hole; and
   a second extending portion located at the second surface, and radially extending from a part of an outer annular surface of the protruding portion toward the first shaft hole.

5. The track link plate of claim 1, further comprising:
   an annular groove concavely disposed on the first surface of the main body along a second axial direction of the second shaft hole, and communicating with the second shaft hole.

6. The track link plate of claim 1, further comprising:
   a strengthening portion, extending outward from the first surface along the first axial direction, and the strengthening portion adjacent to the first shaft hole.

7. A track link assembly, comprising:
   at least two pin assemblies, each of the pin assemblies comprising a pin sleeve and a pin bolt, each of the pin bolts inserted into each of the pin sleeves; and
   at least two track link plates, each of the track link plates comprising:
      a main body;
      a first shaft hole passing through a first end of the main body;
      a second shaft hole passing through a second end of the main body;
      two through holes arranged in an interval between the first shaft hole and the second shaft hole, and passing through the main body along a first axial direction of the first shaft hole;
      a supporting rib located between the two through holes, wherein a thickness of the supporting rib is substantially uniform; and
      a first extending portion protruding outward from a second surface of the main body, located between a rotating inner edge of the main body and an edge of each of the through holes, and extending from the second end toward the first end;
      wherein, a distance between the rotating inner edge of the main body and a rotating outer edge of the main body is a total height, and a distance of the first extending portion from the edge of each of the through holes to the rotating inner edge of the main body is greater than or equal to one third of the total height;
   wherein, one of the pin assemblies passes through and is disposed on the first shaft hole of one of the track link plates from a first surface of the one of the track link plates; the other of the pin assemblies passes through the first shaft hole of another of the track link plates and then passes through and disposes on the second shaft hole of the another of the track link plates, and the second shaft hole of the one of the track link plates is for the pin bolt of the other of the pin assemblies to insert in.

8. The track link assembly of claim 7, wherein each of the track link plates further comprises:
   two assembling holes, each of the assembling holes passing through from each of the through holes to the rotating outer edge.

9. The track link assembly of claim 7, wherein each of the track link plates further comprises:
   a protruding portion annularly protruding from the second surface along a second axial direction of the second shaft hole; and
   a second extending portion located at the second surface, and radially extending from a part of an outer annular surface of the protruding portion toward the first shaft hole.

10. The track link assembly of claim 7, wherein each of the track link plates further comprises:
    an annular groove, concavely disposed on the first surface of the main body along a second axial direction of the second shaft hole and communicating with the second shaft hole; wherein, when one end of the pin sleeve of the other of the pin assemblies is accommodated in the annular groove, the pin bolt of the other of the pin assemblies is inserted into the second shaft hole.

11. The track link assembly of claim 7, wherein each of the track link plates further comprises:
    a strengthening portion, extending outward from the first surface along the first axial direction, and the strengthening portion adjacent to the first shaft hole.

12. The track link assembly of claim 10, wherein each of the pin assemblies further comprises at least two dust proof rings, one of the dust proof rings is sleeved on one end of one of the pin bolts, the other of the dust proof rings is sleeved on another end of one of the pin bolts, each of the dust proof rings is abutted by each of the annular grooves and attached on one end surface of each of the pin sleeves.

* * * * *